Figures 1, 2, 3:
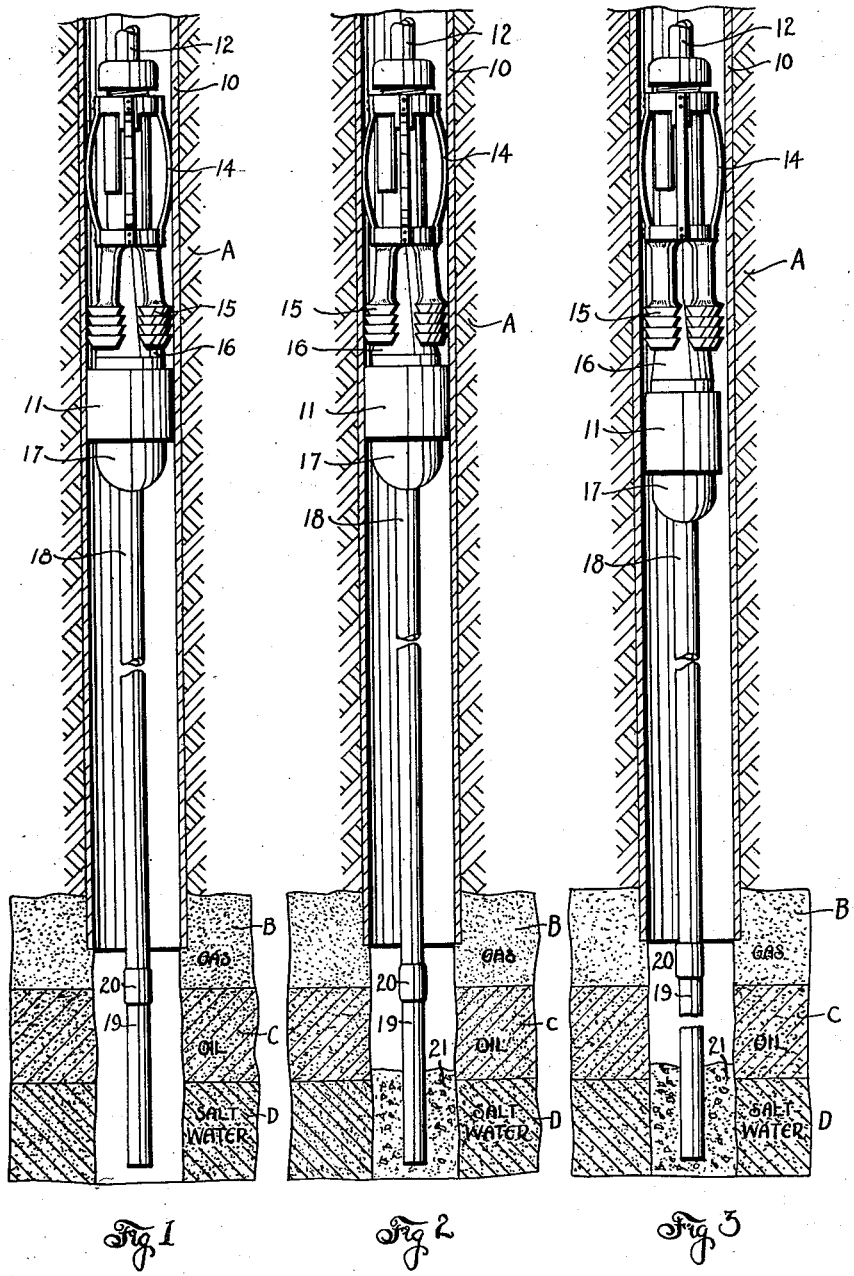

April 13, 1943.  A. B. CANON  2,316,402

CEMENTING WELLS

Filed Aug. 19, 1940

Inventor
ARTHUR B. CANON
By Jack A. Ashley
Attorney

Patented Apr. 13, 1943

2,316,402

UNITED STATES PATENT OFFICE 2,316,402

CEMENTING WELLS

Arthur B. Canon, Houston, Tex.

Application August 19, 1940, Serial No. 353,273

2 Claims. (Cl. 166—1)

This invention relates to new and useful means and methods of and for cementing a well.

In the art of cementing a well, it has been found difficult to conduct the cement to a point below the cementing retainer due to the fact that the cement comes up around the retainer to such an extent that the retainer cannot be removed from the well. It is sometimes advantageous to attach a length of pipe, known as a "tail pipe," to the lower end of the retainer so as to conduct the cement to a point spaced therebelow. In the event a tail pipe is attached to the cement retainer, the tail pipe often becomes stuck in the cement and cannot be removed. Tail pipes have been used heretofore with cement retainers but have been found objectionable, as stated herein above. Also, if the tail pipe is removed before the cement has set, the pressure within the sands being cemented will blow the cement away from said sand, thereby preventing the cement from sealing off the strata for which it was intended. Thus, it is obviously necessary to provide some means for holding the cement in place until the same has set.

It is, therefore, one object of this invention to provide an improved method of cementing a well wherein the cement is conducted down to a point below the retainer and pressure maintained upon said cement until the same has set, and then the tail pipe is released from the cement.

A further object of the invention is to provide an improved method of cementing a well wherein the cement is conducted downwardly to a point sufficiently below the cementing retainer so that said cement will not set around said retainer.

An important object of the invention is to provide an improved method of cementing a well wherein a frangible conductor is connected to a cement retainer, whereby cement may be conducted to a point spaced below the retainer and the conductor fractured to free the retainer from the cement.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a view, partially in elevation and partially in section, showing the retainer and tail pipe in position within the well bore, Figure 2 is a view similar to Figure 1, showing the cement conducted to the desired location, and Figure 3 is a view similar to Figure 1, showing the tail pipe fractured so as to free the retainer from the hardened cement.

In the drawing, the numeral 10 designates a well casing which has been lowered into a well bore A, as shown in the drawing. This method may be employed in any type of cementing; however, the drawing illustrates one instance in which the method is applicable.

In this instance, the sands to be cemented are below the lower end of the casing. There is shown a gas sand B, an oil sand C, and a salt water sand D. The gas sand B is above the oil sand C, the salt water sand D is below the oil sand C, and it is desirable to cement off the salt water sand D. This procedure would be difficult with the ordinary type of cement retainer because the casing A is above the sand D. For example, the salt water sand may be one hundred feet below the end of the casing; therefore, it would be necessary to cement up the entire one hundred feet of hole below the casing, or to extend the casing one hundred feet. However, as will be hereinafter explained, by the use of this method the sand may be readily and easily cemented.

A suitable packer 11 is attached to the lower end of a tubing string 12. The packer 11 may be of any suitable type, and serves as a cement retainer. There has been shown in the drawing, a releasable type of packer. This particular type of packer is set by means of a J-slot (not shown). The wiper blades 14, having contact with the casing A, will hold the slips 15 stationary while the tubing 12 is pulled upwardly, thereby moving the tapered seat 16 upwardly and setting the slips 15 and, by continued upward pull, setting the packer 17. The particular type of packer shown is not new and is in common use, but is shown for the purpose of illustrating how the method may be carried out.

A tubular pipe 18 is attached to the lower end of the packer 11, and has a frangible tubular pipe 19 connected to its lower end by a collar 20. The pipe 19 is of a brittle nature and may be easily broken. However, said pipe is still strong enough to withstand a considerable pressure. In the pursuit of this method, the packer 11 is run into the casing and set, as has been hereinbefore explained. When the packer is set, the pipes 18 and 19 will extend downwardly therefrom to a point opposite the sand to be cemented. This distance may be predetermined so that the operator will know when the end of the pipe 19 is in its proper position. The cement 21 is then pumped down through the pipe 12, through the packer, down through the pipes 18 and 19, and out into the sand C. Fluid has previously been pumped down through the structure so that the well hole, below the packer, is full of fluid. Thus, when the cement 21 comes out of the pipe 19, it must flow out into the sand to be cemented since it cannot compress the fluid already in the well bore. After a sufficient or predetermined amount of cement has been pumped into the sand, it is allowed to harden or set.

The operator then may remove the packer 11 and the tubing 18 below said packer. He releases the packer in the usual manner by lowering the tubing 12, thus allowing the tapered seat 16 to disengage from beneath the slips 15 and freeing the latter from the casing A. This action collapses the packer so that it may be withdrawn from the well bore.

The operator then rotates and/or exerts an upward pull upon the tubing 12, thereby placing a tensile and torsional stress upon the frangible pipe 19 which is imbedded in the hardened cement 21. The pipe 19 will break under this stress, thus releasing the packer and allowing it to be withdrawn from the well with all but a small portion of the pipe 19. If the operator so desires, he may reset his packer and either test or produce the well therethrough, since the well fluid will enter the broken end of the pipe 19 and flow up through the pipe 18, through the packer, and up through the pipe 12 to the surface. Thus, he may test the well without running another tool into said well or, as before explained, he may produce through the packer. As may readily be seen, the fluid conducted down into the well bore, below the packer, will prevent the cement from forcing its way up to the packer. Therefore, the packer will not be surrounded by cement to such an extent that it cannot be removed from the well.

It is pointed out, that the tail pipe 19 may be formed of any suitable frangible material, as is shown in the drawing. In addition, the collar 20 may be replaced by a suitable shear pin structure (not shown) or by a left-hand threaded joint (not shown), which will allow the pipe 19 to be disconnected from the pipe 18.

The method herein disclosed also may be employed where the cementing job is to be done within the casing. An example of such a cementing job would be a squeeze job. In this instance, the packer is set in the manner described hereinbefore, so that the tail pipe will be opposite the strata to be cemented. Access is usually had to this strata through perforations in the casing. Since there is usually fluid present in the well bore, the cement will be withheld from moving upwardly and contacting the packer. Thus, the method is utilized in this instance in much the same manner as has been hereinbefore described.

Various changes, alterations, and modifications may be made in the size, shape, and arrangement of the herein described elements within the scope of the appended claims.

What I claim and desire to secure by Letters Patent is:

1. An apparatus for cementing a well bore including, a packer adapted to be lowered into the well bore upon tubing, a tail pipe depending from the packer and being adapted to receive cement from the tubing for conducting the same to the desired formation, the tail pipe having a frangible lower portion, said packer and tail pipe being adapted to be set within said well bore by said tubing so that the frangible lower portion of the tail pipe is disposed within said desired formation, whereby cement may be forced into the formation and allowed to harden around said frangible lower portion and whereby after such hardening the frangible lower portion may be ruptured so as to release said tail pipe and packer from the cement and permit removal of the same from the well bore.

2. A well cementing apparatus including, a releasable packer adapted to be set in well casing, a tubing for setting the packer, a tail pipe extending downwardly from the lower end of the packer and adapted to receive cement from the tubing, and a frangible pipe secured to the lower end of the tail pipe for receiving and conducting cement from said tail pipe to the formation to be cemented, whereby after the cement has been pumped downwardly through the tail pipe and frangible pipe into said formation and has become hardened, said frangible pipe may be ruptured so as to release said tail pipe and packer from said cement and allow removal of the same from the well.

ARTHUR B. CANON.